(12) United States Patent
Boltze

(10) Patent No.: US 9,893,328 B2
(45) Date of Patent: Feb. 13, 2018

(54) THERMALLY INSULATING APPARATUS FOR ACCOMMODATING AT LEAST ONE COMPONENT OF AN SOFC FUEL CELL SYSTEM, AND METHOD FOR PRODUCING AN APPARATUS OF THIS KIND

(71) Applicant: ELRINGKLINGER AG, Dettingen/Erms (DE)

(72) Inventor: Matthias Boltze, Wulkenzin (DE)

(73) Assignee: ELRINGKLINGER AG, Dettingen/Erms (DE)

( * ) Notice: Subject to any disclaimer, the term of this patent is extended or adjusted under 35 U.S.C. 154(b) by 0 days.

(21) Appl. No.: 14/654,043

(22) PCT Filed: Dec. 4, 2013

(86) PCT No.: PCT/EP2013/075480
§ 371 (c)(1),
(2) Date: Jun. 19, 2015

(87) PCT Pub. No.: WO2014/095369
PCT Pub. Date: Jun. 26, 2014

(65) Prior Publication Data
US 2015/0349305 A1  Dec. 3, 2015

(30) Foreign Application Priority Data
Dec. 19, 2012 (DE) .................. 10 2012 223 864

(51) Int. Cl.
*H01M 2/10* (2006.01)
*H01M 8/12* (2016.01)
(Continued)

(52) U.S. Cl.
CPC ....... *H01M 2/1022* (2013.01); *H01M 2/1072* (2013.01); *H01M 8/04067* (2013.01);
(Continued)

(58) Field of Classification Search
CPC .... H01M 2/1022; H01M 2/1072; H01M 8/12; H01M 8/2475; H01M 8/248;
(Continued)

(56) References Cited

U.S. PATENT DOCUMENTS

| 5,532,072 A | 7/1996 | Spaeh |
| 2002/0178870 A1 | 12/2002 | Lowther |
| 2010/0062297 A1 | 3/2010 | Hafemeister et al. |
| 2010/0068597 A1 | 3/2010 | Hafemeister et al. |

(Continued)

FOREIGN PATENT DOCUMENTS

| DE | 60305596 T2 | 5/2007 |
| DE | 10 2006 060809 A1 | 6/2008 |

(Continued)

OTHER PUBLICATIONS

International Search Report and Written Opinion dated Mar. 5, 2014, from the corresponding PCT/EP2013/075480.

(Continued)

*Primary Examiner* — Jane Rhee
(74) *Attorney, Agent, or Firm* — Hassan Abbas Shakir; Katten Muchin Rosenman LLP

(57) ABSTRACT

An apparatus for accommodating at least one component of a SOFC fuel cell system includes a thermally insulating inner box and an outer box that surrounds the inner box. The inner box includes a base, a cover, and side panels. The outer box bears against the base, the cover, and the side panels of the inner box and presses them together, and wherein the at least one component can be arranged in the interior of the inner box. The base, the cover, and the side panels are at least partly over-dimensioned so that the inner box can be assembled with a press-fit.

11 Claims, 1 Drawing Sheet

(51) Int. Cl.
*H01M 8/2475* (2016.01)
*H01M 8/248* (2016.01)
*H01M 8/04007* (2016.01)
*H01M 8/2485* (2016.01)
*H01M 8/124* (2016.01)

(52) U.S. Cl.
CPC ............ *H01M 8/12* (2013.01); *H01M 8/248* (2013.01); *H01M 8/2475* (2013.01); *H01M 8/2485* (2013.01); *H01M 2008/1293* (2013.01); *H01M 2300/0074* (2013.01); *Y02P 70/56* (2015.11)

(58) Field of Classification Search
CPC ........... H01M 8/2485; H01M 8/04067; H01M 2300/0074; H01M 2008/1293
See application file for complete search history.

(56) References Cited

U.S. PATENT DOCUMENTS

| | | | |
|---|---|---|---|
| 2010/0098978 | A1 | 4/2010 | Hafemeister et al. |
| 2011/0171544 | A1 | 7/2011 | Burmeister et al. |
| 2013/0029243 | A1 | 1/2013 | Burmeister |

FOREIGN PATENT DOCUMENTS

| | | |
|---|---|---|
| DE | 102009034141 A1 | 1/2011 |
| DE | 10 2010 006705 B3 | 4/2011 |
| EP | 0637091 | 2/1995 |
| WO | 2013/008654 A1 | 1/2013 |

OTHER PUBLICATIONS

Office Action dated Apr. 30, 2013, from the corresponding DE 10 2012 223 864.6.

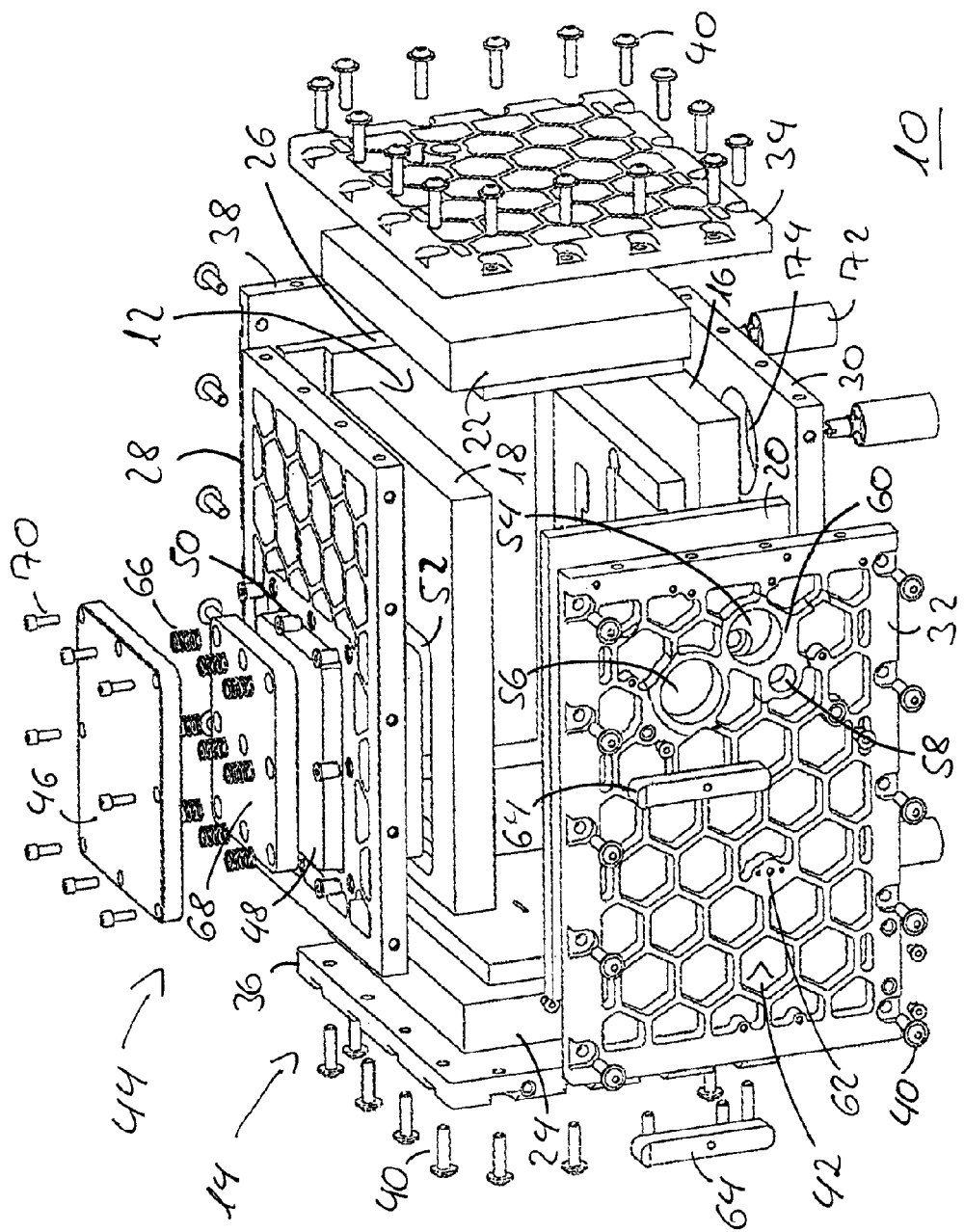

THERMALLY INSULATING APPARATUS FOR ACCOMMODATING AT LEAST ONE COMPONENT OF AN SOFC FUEL CELL SYSTEM, AND METHOD FOR PRODUCING AN APPARATUS OF THIS KIND

BACKGROUND OF THE INVENTION

1. Field of the Invention

The present invention relates to an apparatus for accommodating at least one component of a SOFC fuel cell system comprising a thermally insulating inner box and an outer box surrounding the inner box, wherein the inner box comprises a base, a cover, and side panels, wherein the outer box bears against the base, the cover, and the side panels of the inner box and presses them together, and wherein the at least one component can be arranged in the interior of the inner box.

The present invention further relates to a method for producing such an apparatus.

2. Discussion of the Related Art

It is known to, at least partly, position components of a SOFC fuel cell system in a so-called "hot box" which may, at least partly, accommodate particularly those components of an SOFC fuel cell system which become very hot during operation. Such an apparatus for accommodating at least one component of a SOFC fuel cell system is, for example, known from the DE 10 2006 060 809 A1.

What is problematic with such designs is particularly the shrinkage of a used insulation material which may lead to more or less large or deep cracks or gaps in the insulation.

The present invention is, accordingly, based on the object to prevent any crack/gap formation and to improve the insulating properties in this way.

SUMMARY OF THE INVENTION

According to the invention, this object is solved by the base, the cover, and the side panels being at least partly over-dimensioned so that the inner box can be assembled by press-fitting. By over-dimensioning a press-fitting is obtained by compressing the base, the cover, and the side panels which together form the thermally insulating inner box. A particularly initial shrinkage at the base, the cover, and/or the side panels resulting from the pressure and the high temperature during the operation of the SOFC fuel cell system will therefore not lead to the formation of cracks and/or gaps between the base, the cover, and/or the side panels which together form the insulating inner box. The term "over-dimensioning" thus characterises the dimensions of the base, the cover and the side panels relative to each other. At least some of the dimensions of the base, of the cover, and/or the side panels exceed the possible maximum dimensions in the assembled state of the inner box. During the assembly of the inner box, accordingly, the press-fitting is formed. The press-fitting enables a zero-clearance/gap-free fitting of the parts of the inner box by a mechanical deformation of parts of the inner box required for the assembly. Owing to the mechanical deformation the formation of heat bridges by crack formation is reliably prevented even after a particularly initial material shrinkage at the parts of the inner box. The base and/or the cover and/or the side panels may, for example, be manufactured of a microporous insulating material. The base and/or the cover and/or the side panels may, for example, have a wall thickness of 3 mm to 50 mm, preferably approximately 40 mm. The outer box bearing against the respective outer sides of the base, of the cover and of the side panels may, for example, compress the inner box from all sides to the extent that the desired press-fitting is obtained. The base and/or the cover and/or the side panels are deformed accordingly by the outer box during assembly.

Usefully, it may be contemplated that the outer box comprises an outer cover, an outer base, and outer side panels. In this way a simple assembly of the outer box can be realised. The outer cover and/or the outer base and/or the outer side panels may, for example, be manufactured of a plastic material having a higher solidity as compared to the insulation material used for the insulating inner box. In particular, the outer cover and/or the outer base and/or the outer side panels may be made of polyamide or metal. The outer base and/or the outer cover and/or the outer side panels may, for example, be produced by an injection moulding method. The outer base and/or the outer cover and/or the outer side panels may, for example, have a wall thickness from 10 mm to 30 mm, preferably approximately 20 mm.

Advantageously it may be contemplated that the outer cover and/or the outer side panels and/or the outer base are connectable to the outer box surrounding the inner box by means of fixing means. In this way the outer box may uniformly compress the inner box from all sides. The fixing means used may, for example, comprise screws and/or nuts and/or rivets. In particular, the fixing means may comprise self-tapping screws so that, on the one hand, a releasable connection can be established between the outer cover and/or the outer base and/or the outer side panels, and, at the same time, the separate production of a thread for accommodating the self-tapping screw can be omitted. Possibly even the separate production of a drilled hole for accommodating the screw may be omitted. The fixing means may further comprise an adhesive bond between the outer cover and/or the outer base and/or the outer side panels. The adhesive bond may, for example, not be formed so as to be heat resistant to enable a preliminary simple pre-installation of the outer box without any further fixing means. A final installation of the outer box may then, for example, be implemented with the aid of further readily releasable fixing means, for example screws. In this way the outer box may be reopened without problems without having to do without a facilitated pre-installation in case of a subsequent defect after the activation of the SOFC fuel cell system.

It may also be contemplated that the outer cover and/or the outer base and/or the outer side panels are designed as a reinforced hollow structure. In this way the apparatus may be designed so that it is altogether more lightweight since material can be saved on the outer box without its stability being reduced to a relevant extent. The reinforced hollow structure may, for example, be formed as a thin cover layer which may be part of the outer cover and/or of the outer base and/or the outer side panels on the side of the outer cover and/or of the outer base and/or the outer side panels facing the inner box and/or on the side of the outer cover and/or of the outer base and/or the outer side panels facing away from the von the inner box. This thin cover layer may, for example, serve pressure distribution on the side facing the inner box. On the side of the outer box facing away from the inner box the thin cover layer may, for example, improve the insulating effect of the apparatus since insulating air cushions are formed in the reinforced hollow structure.

Usefully it may further be contemplated that a clamping device comprising a cover plate and a clamping block is provided, wherein the clamping block can, at least partly, be arranged in a clamping orifice in the outer box and a corresponding further clamping orifice in the inner box, and wherein the cover plate can be fixed on the outer box so that the clamping block is, at least partly, pressed into the interior of the inner box. By providing the clamping device a fuel cell stack arranged in the interior of the inner box may be separately compressed in its preferred thermally-induced linear expansion direction perpendicular to the stacking direction of the individual fuel cells. In this way, the density of an SOFC fuel cell stack disposed in the inner box can be ensured even in case of an operation-related shrinkage of the commonly used glass seals.

Furthermore, it may also be contemplated that the at least one component which can be positioned in the interior of the inner box is an SOFC fuel cell stack and/or a fuel reformer and/or an afterburner heat exchanger unit. In this way, all or at least important parts of the SOFC fuel cell system, particularly those components of the SOFC fuel cell system which become particularly hot during operation, may be placed in the interior of a single insulating box together.

It may also be contemplated that corresponding supply orifices through which supply lines may be passed are provided in the outer box and in the inner box, wherein fuel and air can be supplied to the interior of the inner box via the supply lines, and waste gas and generated electric current can be discharged from or lead out of the interior of the inner box. By providing corresponding supply orifices in the outer box and in the inner box connection lines may be guided to the components of the SOFC fuel cell system disposed in the interior of the apparatus in a particularly convenient way. In this way, in particular, no terminals to be elaborately manufactured so as to be closable have to be provided in wall sections of the outer box and/or in wall sections of the inner box. The supply lines may be conveniently passed through the corresponding supply orifices.

In this connection it may be contemplated that the supply orifices in the outer box are designed as at least one insert formed of an insulating material, wherein the insulating material has an increased stability as compared to the remainder the outer box. In this way it may, in particular, be ensured that heat bridges possibly forming at the supply lines will not damage the outer box. Furthermore, a run of the supply lines through the supply orifices which is safe and precise even during the operation of the SOFC fuel cell system can be ensured so that particularly the supply orifices provided in the inner box are not damaged, for example, widened by the supply lines.

It may also be contemplated that the outer box comprises at least one support device for a control device and/or for an ancillary unit of the SOFC fuel cell system, wherein the control device is designed for controlling the at least one component which can be positioned in the interior of the inner box. In this way, other components of the SOFC fuel cell system may be mountable and possibly exchangeable together with the apparatus. Furthermore, a multiple use of the outer box is rendered possible in this way.

In addition, it may be contemplated that the at least one support device is mountable on the outer box and/or integrally formed with the outer box. If the support device is mountable on the uniformly designed outer box a variable design of the outer box may be achieved so that an individualisation of the arrangement of components mountable on the support device is rendered possible. For example, the positioning of individual components may be varied depending on the available space. Likewise, different components, for example, components differing with regard to their performance and requiring different support devices may be mountable on the uniformly designed outer box. If the support device is integrally formed with the outer box, for example, by an injection moulding method from the same material as the rest of the outer box, the outer box may be used for mounting components on the outer side of the outer box without any additional effort.

The method according to the invention is based on the generic method for producing the apparatus according to the invention in that the inner box is assembled by press-fitting.

BRIEF DESCRIPTION OF THE DRAWING

The invention will now be explained by way of example with the aid of a preferred embodiment with reference to the accompanying drawing in which:

FIG. 1 shows a three-dimensional exploded view of an apparatus for accommodating at least one component of an SOFC fuel cell system.

DETAILED DESCRIPTION OF THE INVENTION

FIG. 1 shows a three-dimensional exploded view of an apparatus 10 for accommodating at least one component of a SOFC fuel cell system. The apparatus 10 comprises an inner box 12 and an outer box 14. The outer box 14 surrounds the inner box 12. In the interior of the inner box 12, components of a SOFC fuel cell system not shown in FIG. 1 may be positioned. These components may, for example, be an SOFC fuel cell stack and/or a fuel reformer and/or an afterburner heat exchanger unit. The inner box 12 comprises a base 16, a cover 18, and side panels 20, 22, 24, and 26. The base 16, and/or the cover 18, and/or the side panels 20, 22, 24, and 26 are formed of a thermally insulating material, for example, a microporous insulating material. The base 16, and/or the cover 18, and/or the side panels 20, 22, 24, and 26 may optionally have a smaller material thickness at their edges than in their respective centre as shown in FIG. 1 so that, particularly, circumferential bridges having a lower material thickness may be formed at their respective edges. In this way, the formation of continuous gaps which would lead to a continuous crack reducing the insulating effect of the inner box 12 in case of material shrinkage of the insulating material can be prevented during the assembly of the components of the inner box 12. The base 16, the cover 18, and the side panels, 20, 22, 24, and 26 are partly manufactured so as to be over-dimensioned so that a complete fitting into the inner box 12 is only possible by applying pressure acting on the outer sides of the inner box 12 and provided by the outer box 14. While the inner box 12 is assembled a press-fitting is generated. The term "over-dimensioning" thus characterises the dimensions of the base 16, of the cover 18 and the side panels 20, 22, 24, and 26 relative to each other. At least some of the dimensions of the base 16, of the cover 18 and/or the side panels 20, 22, 24, and 26 exceed the possible maximum dimensions of the inner box 12 in the assembled state. When fitting the inner box 12 therefore the press-fitting is produced. The press-fitting renders a zero-clearance/gap-free assembly of the parts of the inner box 12 by a mechanical deformation of the base 16, of the cover 18, and/or of the side panels 20, 22, 24, 26 of the inner box 12 required for fitting possible. Owing to the mechanical deformation the formation of heat bridges due to crack formation is reliably prevented even after an especially initial material shrinkage at the parts of the inner box 12.

The outer box 14 may comprise an outer cover 28, an outer base 30 and outer side panels 32, 34, 36, and 38. The outer cover 28, the outer base 30, and the outer side panels 32, 34, 36, and 38 may, for example, be assembled with the outer box 14 with the aid of fixing means 40. In the assembled state the inner sides of the outer cover 28, of the outer base 30, and of the outer side panels 32, 34, 36, and 38 apply uniform compression forces to the outer sides of the inner box 12 so that it is assembled by press-fitting. The fixing means 40 may, for example, comprise screws. In this way, the outer cover 28, the outer base 30, and the outer side panels 32, 34, 36, and 38 may be screwed together. As shown in FIG. 1, holes for accommodating the fixing means 40 formed as screws may be provided in the outer cover 28 and/or the outer base 30 and/or the outer side panels 32, 34, 36, and 38. If the fixing means 40 is designed as a self-tapping screws the holes or at least threads located in the holes and interacting with the fixing means 40 may be omitted. The self-tapping screws may generate the holes and/or the threads themselves during the installation, i.e. when they are screwed in. For facilitating the installation of the outer box 14, an adhesive bond not explicitly shown in FIG. 1 may be provided between the outer cover 28 and the outer side panels, 32, 34, 36, and 38 as well as between the outer base 30 and the outer side panels 32, 34, 36, and 38. This adhesive bond may be regarded as part of the fixing means 40. If the adhesive bond is provided other fixing means, for example in the form of the screws shown in FIG. 1, may be omitted as required. If the fixing device 40 comprises both the screws shown in FIG. 1 and an adhesive bond between the individual parts of the outer box 14 it may be contemplated that the adhesive bond used is not heat resistant or soluble in water for facilitating the removal of the outer box 14. The installation of the outer box 14 may then be subdivided into a pre-installation and a final installation. The pre-installation may comprise the assembly of the outer box 14 with the aid of the adhesive bond. The final installation may comprise the final screwing-in of additional fixing means 40 formed as screws. In this way a securing of the outer box 14 can already be omitted during the final installation. If the adhesive bond used is not heat resistant or not water-insoluble a simple removal of the outer box 14 can also be rendered possible. The outer cover 28 and/or the outer base 30 and/or the outer side panels 32, 34, 36, and 38 may have a hollow structure 42 as shown in FIG. 1. The hollow structure 42 may, for example, be a simple honeycomb structure. The hollow structure 42 renders the saving of material possible which leads to a weight reduction without the stability of the outer box 14 being affected. The hollow structure 42 may be covered with thin plates allocated to the outer cover 28, the outer base 30, and the outer side panels 32, 34, 36, and 38. In this way, on the one hand, a uniform distribution of the compression forces acting on the inner box 12, and, on the other hand, an improvement of the insulating effect of the apparatus 10 attributable to the air cushions enclosed in the hollow structure 42 may be achieved.

The apparatus 10 may further comprise a clamping device 44. As shown in FIG. 1, the clamping device 44 may comprise a cover plate 46, a clamping block 48, a pressure distribution plate 68, and elastic elements 66. The clamping block 48 may be pressed into the interior of the inner box 12 through a clamping orifice 50 and a corresponding additional clamping orifice 52 and thereby clamp a fuel cell stack not shown in FIG. 1 in the mounted state of the clamping device 44. The clamping force required for this purpose may be achieved by fixing the cover plate 46 on the outer cover 28 with the aid of fixing elements 70, wherein the applied force can be uniformly transferred to the clamping block 48 via the elastic elements 66 and the pressure distribution plate 68. It is possible that a fuel cell stack positioned in the interior of the apparatus 10 is removable by removing the clamping device 44. It is further possible that the fuel cell stack is only inserted after the fitting of the inner box 12 and the outer box 14 into the apparatus 10 before it is finally closed by the clamping device 44. The clamping force applied by the clamping device 44 may be adjusted via the elastic elements 66 and, for example, amount to 500 N to 600 N, preferably approximately 550 N. The elastic elements 66 may, for example, be formed as coil springs.

The outer box 14 may comprise supply orifices 54, 56, 58, and 74. The supply orifices 54, 56, 58, and 74 may extend through the outer box 14 and the inner box 12. However, it is also feasible that the supply orifices 54, 56, 58, and 74 only extend through the outer box 14. For example, the supply orifices 54, 56, and 58 may be located in the front outer side panel 32. The supply orifice 74 may, for example, be located in the outer base 30. The supply orifices 54, 56, 58, and 74 may serve the supply of fuel and air as well as the lead-away of generated electric energy and the discharge of waste gas. In particular, if the supply orifices 54, 56, and 58 extend through the outer box 14 and the inner box 12, an insert 60 formed of a heat insulating material having a high stiffness may be provided in the outer box 14. In this way, heat bridges at supply lines passed through the supply orifices 54, 56, and 58 which might cause damage to the outer box 14 by heat may be avoided. Furthermore, damage to the supply orifices 54, 56, and 58 in the inner box 12, for example by widening, may be prevented in this way since the supply lines are accurately passed through the orifices. In this way, a gap formation between the supply lines and the inner box 12 which may reduce the insulating effect of the inner box 12 is prevented.

On the outer box 14, for example on the front outer side panel 32, support devices 62, 64 may be provided. For example, FIG. 1 shows the support device 62 integrally formed with the front outer side panel 32. The support device 62 may, for example, be formed as a hole for accommodating a mounting device not shown in FIG. 1 on a bulge of the hollow structure 42. Further, support devices 64 which may be mountable on the front outer side panel 32 and in turn render the installation of further components of the SOFC fuel cell system possible are shown in FIG. 1. The support device 62 may also permit the installation von additional components of the SOFC fuel cell system on the apparatus 10.

On the outer base 30, further, base elements 72 may be provided which may permit a fixation of the apparatus 10 in, for example, a housing of the SOFC fuel cell system not shown in FIG. 1.

A thin cover of the hollow structure 42 can, for example, be seen on the outer base 30. Alternatively it is possible to design the outer cover 28 and/or the outer base 30 and/or the outer side panels 32, 34, 36, and 38 so as to be massive, i.e. particularly without a hollow structure 42.

For the assembly of the apparatus 10 first the base 16 is stacked onto the outer base 30. Then the components of the SOFC fuel cell system to be positioned in the interior of the box 12 may be pre-mounted on the inner base 16. Thereafter, the side panels, 20, 22, 24, and 26 may be loosely brought up to the base 16. By applying the cover 18, the side panels, 20, 22, 24, and 26 can first be temporarily held in this position. Now the installation of the outer side panels 32, 34, 36, and 38 is performed, wherein, preferably, first two opposing outer side panels are fixed on the outer base 30, particularly the front outer side panel 32 and the rear outer side panel 38. Finally the outer cover 28 can be joined with the remaining parts of the outer box 14 so that both the outer box 14 and the inner box 12 are mounted. The insertion of the clamping device 44 may be performed after the installation of the outer cover 28.

The features of the invention described in the above description, the drawing, as well as in the claims may be important for the realisation of the invention both individually and in any combination.

LIST OF NUMERALS 10 apparatus
12 inner box
14 outer box
16 base
18 cover
20 side panel
22 side panel
24 side panel
26 side panel
28 outer cover
30 outer base
32 outer side panel
34 outer side panel
36 outer side panel
38 outer side panel
40 fixing device
42 hollow structure
44 clamping device
46 cover plate
48 clamping block
50 clamping orifice
52 additional clamping orifice
54 supply orifice
56 supply orifice
58 supply orifice
60 insert
62 support device
64 support device
66 elastic element
68 pressure distribution plate
70 fixing element
72 base element
74 supply orifice

What is claimed is:

1. In combination, a component of a SOFC fuel cell system and an apparatus for accommodating the component of an SOFC fuel cell system, the combination comprising the component, the component comprising an SOFC-fuel cell stack of SOFC fuel cell system; the apparatus, the apparatus comprising:
a thermally insulating inner box, the inner box comprising an inner base, an inner cover, and a plurality of inner side panels; and
an outer box surrounding the inner box, the outer box bearing against the inner base, the inner cover, and the plurality of inner side panels of the inner box and pressing the inner base, the inner cover, and the plurality of inner side panels together;
wherein the SOFC-fuel cell stack is arranged in the interior of the inner box;
wherein the inner base, the inner cover, and the plurality of inner side panels are over-dimensioned so that the inner box can be assembled by press-fitting for a zero-clearance, gap-free fit;
wherein the inner side panels, the inner cover, and the inner base comprise respective mechanical deformations after press-fitting.

2. The combination according to claim 1, wherein the outer box comprises an outer cover, an outer base, and a plurality of outer side panels.

3. The combination according to claim 2, wherein the outer cover or the plurality of outer side panels or the outer base are connectable to the outer box surrounding the inner box by means of fixing means.

4. The combination according to claim 2, wherein the outer cover or the outer base or the plurality of outer side panels are designed as a reinforced hollow structure.

5. The combination according to claim 1, further comprising
a clamping device comprising a cover plate and a clamping block,
wherein the clamping block is arranged in an outer clamping orifice in the outer box and a corresponding inner clamping orifice in the inner box, and
wherein the cover plate is fixable on the outer box for pressing the clamping block into the interior of the inner box.

6. The combination according to claim 1, wherein a fuel reformer or an afterburner heat exchanger unit is positioned in the interior of the inner box.

7. The combination according to claim 1, further comprising
a plurality of supply orifices through which supply lines can be passed are provided in the outer box and in the inner box,
wherein fuel and air can be supplied to an interior space of the inner box, and waste gas and generated electric current can be guided out of the interior space of the inner box via the supply lines.

8. The combination according to claim 7, wherein the plurality of supply orifices in the outer box are designed as at least one insert formed of an insulating material, wherein the insulating material has an increased stability as compared to a rest of the outer box.

9. The combination according to claim 1, wherein the outer box comprises at least one support device for a control device or for an ancillary unit of the SOFC fuel cell system,
wherein the control device is designed for controlling the component which can be positioned in an interior space of the inner box.

10. The combination according to claim 9, wherein the at least one support device is mountable on the outer box or integrally formed with the outer box.

11. A method for producing a combination of a component of a SOFC fuel cell system and an apparatus for accommodating the component of an SOFC fuel cell system the component comprising an SOFC-fuel cell stack of the SOFC fuel cell system;
the apparatus comprising
a thermally insulating inner box, the inner box comprising an inner base, an inner cover, and a plurality of inner side panels; and
an outer box surrounding the inner box, the outer box bearing against the inner base, the inner cover, and the plurality of inner side panels of the inner box and pressing the inner base, the inner cover, and the plurality of inner side panels together;
wherein the SOFC-fuel cell stack is arranged in the interior of the inner box;
wherein the inner base, the inner cover, and the plurality of inner side panels are over-dimensioned;

the method comprising the steps of:
- press-fitting the inner base, the inner cover, and the plurality of inner side panels to make the inner box for a zero-clearance, gap-free fit; and
- pressing, by the outer box, the inner base, the inner cover, and the plurality of inner side panels against each other;
- wherein the step of press-fitting is performed by mechanically deforming the inner side panels, the inner cover, and the inner base.

* * * * *